United States Patent
Sim et al.

(10) Patent No.: US 9,733,344 B2
(45) Date of Patent: Aug. 15, 2017

(54) LASER RADAR APPARATUS AND METHOD FOR OPERATING THEREOF

(71) Applicant: Electronics and Telecommunications Research Institute, Daejeon (KR)

(72) Inventors: Jae Sik Sim, Daejeon (KR); Ki Soo Kim, Seoul (KR); Bong Ki Mheen, Daejeon (KR); Myoung Sook Oh, Daejeon (KR); Hong Seok Seo, Daejeon (KR); Jung Ho Song, Daejeon (KR); Yong Hwan Kwon, Daejeon (KR); Dong Sun Kim, Yeongju-si (KR); Min Hyup Song, Daejeon (KR); Gyu Dong Choi, Jeonju-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 420 days.

(21) Appl. No.: 14/517,119

(22) Filed: Oct. 17, 2014

(65) Prior Publication Data

US 2015/0146190 A1    May 28, 2015

(30) Foreign Application Priority Data

Nov. 25, 2013   (KR) .................. 10-2013-0143942
Jun. 12, 2014   (KR) .................. 10-2014-0071586

(51) Int. Cl.
*G01C 3/08*    (2006.01)
*G01S 7/481*   (2006.01)
(Continued)

(52) U.S. Cl.
CPC ............ *G01S 7/4817* (2013.01); *G01S 17/06* (2013.01); *G01S 17/42* (2013.01); *G01S 17/87* (2013.01); *G01S 17/89* (2013.01); *G01S 17/936* (2013.01)

(58) Field of Classification Search
CPC ........ G01S 7/4817; G01S 17/87; G01S 17/89; G01S 17/42; G01S 17/936
(Continued)

(56) References Cited

U.S. PATENT DOCUMENTS 3,953,131 A * 4/1976 Britz ................ G01S 17/42
                                                   250/206.2
5,705,804 A * 1/1998 Ramer ............... G01S 3/7835
                                                   250/203.3
(Continued)

FOREIGN PATENT DOCUMENTS

KR    2011-0068994 A    6/2011
KR    2012-0070129 A    6/2012
(Continued)

OTHER PUBLICATIONS

M. Himmelsbach et al., "LIDAR-based 3D Object Perception", In Proceedings of 1st International Workshop on Cognition for Technical Systems, München, Oct. 2008.

*Primary Examiner* — Mark Hellner
(74) *Attorney, Agent, or Firm* — Rabin & Berdo, P.C.

(57) ABSTRACT

Provided herein a laser radar apparatus including a plurality of light transmission and reception modules arranged concavely in an opposite direction to a scanning direction based on a surface vertical to the scanning direction, wherein each of the plurality of light transmission and reception modules comprises a transmitter configured to deflect a laser beam
(Continued)

and to irradiate the deflected laser beam to a target; and a receiver configured to receive the laser beam reflected from the target.

12 Claims, 8 Drawing Sheets

(51) Int. Cl.
  *G01S 17/06* (2006.01)
  *G01S 17/89* (2006.01)
  *G01S 17/93* (2006.01)
  *G01S 17/42* (2006.01)
  *G01S 17/87* (2006.01)

(58) Field of Classification Search
  USPC ........................................................ 356/4.01
  See application file for complete search history.

(56) References Cited

U.S. PATENT DOCUMENTS

| | | | |
|---|---|---|---|
| 8,896,695 B2* | 11/2014 | Peters, III | G01C 11/025 348/144 |
| 2006/0145062 A1* | 7/2006 | Boehlau | G01S 7/4811 250/221 |
| 2006/0209194 A1 | 9/2006 | Liu et al. | |
| 2010/0020306 A1 | 1/2010 | Hall | |
| 2012/0154546 A1 | 6/2012 | Ban et al. | |
| 2012/0249996 A1* | 10/2012 | Tanaka | G01S 17/42 356/4.01 |

FOREIGN PATENT DOCUMENTS

| | | |
|---|---|---|
| KR | 2013-0114100 A | 10/2013 |
| WO | WO-2010-019757 A1 | 2/2010 |
| WO | WO-2012-040463 A2 | 3/2012 |

* cited by examiner

LASER RADAR APPARATUS AND METHOD FOR OPERATING THEREOF

CROSS-REFERENCE TO RELATED APPLICATION

The present application claims priority to Korean patent application numbers 10-2013-0143942, filed on Nov. 25, 2013 and 10-2014-0071586, filed on Jun. 12, 2014, the entire disclosure of which is incorporated herein in its entirety by reference.

BACKGROUND

Field of Invention

Various embodiments of the present invention relate to a laser radar system, and more particularly, to a laser radar system that is capable of reducing the number of light transmission and reception unit modules, and an operating method thereof.

Description of Related Art

Generally, in order to obtain a 3-dimensional image, a laser radar system includes, at an upper portion of a vehicle, a panoramic scan radar configured to rotate, and a protruding real time wide angle laser radar.

Such a panoramic scan radar includes a plurality of laser generating modules and a plurality of light detectors. Herein, it is difficult to align the laser generating modules and the light detectors corresponding thereto such that scanning can be performed in one line format or in a predetermined format. That is, it is necessary to examine the observation range of the signal detected from each light detector, and modify the array arrangement of the laser generating modules and light detectors to fit the specifications. This increases the unit price of a module, and makes mass production difficult. Furthermore, a panoramic scan radar can obtain a 2-dimensional image without a module rotating, but in order to obtain a 3-dimensional image, all the laser generating modules and light detectors must rotate.

Next, in a wide angle laser radar, in order to obtain a wide angle 3-dimensional image, a plurality of cameras are provided, thereby increasing the Field Of View (hereinafter referred to as 'FOV'). Herein, a camera farther from the center has a greater FOV value. Furthermore, the wide angle laser radar includes a wide angle image photographing apparatus having the shape of a funnel and including a plurality of cameras that output a photographed image. Furthermore, the wide angle laser radar may include a wide angle stitching system having the shape of a funnel for generating a stitch table through which an assembled bending table is made. A photographed image is processed using the bending table to modify distortion and delay problems.

The aforementioned conventional laser radar systems are problematic in that they must be provided with a plurality of light transmission and reception modules in order to perform a panoramic scanning. Furthermore, these conventional laser radar systems are problematic in that they include a module for rotation and that they cannot be easily mounted inside a moving object due to their structural problems.

SUMMARY

A purpose of various embodiments of the present invention is to provide a laser radar apparatus that is capable of reducing the number of light transmission and reception unit modules for obtaining image information, and an operating method thereof.

Another purpose of various embodiments of the present invention is to provide a laser radar apparatus that is small and may be mounted inside a moving object, and an operating method thereof.

According to an embodiment of the present invention, there is provided a laser radar apparatus including a plurality of light transmission and reception modules arranged concavely in an opposite direction to a scanning direction based on a surface vertical to the scanning direction, wherein each of the plurality of light transmission and reception modules includes a transmitter configured to deflect a laser beam and to irradiate the deflected laser beam to a target; and a receiver configured to receive the laser beam reflected from the target.

In the embodiment, the transmitter may include a light source configured to generate a laser beam; and a light deflector configured to deflect the laser beam output from the light source and to irradiate the laser beam to the target.

In the embodiment, the receiver may include a light detector configured to detect the laser beam reflected from the target as the light deflector irradiates the laser beam.

In the embodiment, the receiver further includes a light filter configured to filter the laser beam; and a light receiving lens configured to form a focus to output the laser beam to the light detector.

In the embodiment, the plurality of light transmission and reception modules may be divided into two or more groups, and the transmitters and receivers belonging to a group may be driven in a different time frame from the transmitters and receivers belonging to other groups.

In the embodiment, adjacent light transmission and reception modules may be divided into different groups from one another.

In the embodiment, of the plurality of light transmission and reception modules, a first group including oddnumber$^{th}$ light transmission and reception modules based on a light transmission and reception module disposed at one side is operated in an Odd time frame, and a second group including evennumber$^{th}$ light transmission and reception modules based on the light transmission and reception module disposed at one side is operated in an Even time frame, the Odd time frame and the Even time frame not overlapping each other in a time domain.

In the embodiment, the apparatus may further include a signal reader configured to control the plurality of light transmission and reception modules to operate at different time periods from one another, and to read the signals received through laser beam transmission and reception from each of the plurality of light transmission and reception modules; and an image processor configured to obtain at least one of a location, distance and image of the target based on the signals read.

In the embodiment, the laser radar apparatus may be connected to a moving object.

In the embodiment, the plurality of light transmission and reception modules may be arranged to be spaced by a predetermined distance based on a width direction of the moving object.

In the embodiment, the plurality of light transmission and reception modules may be arranged to be laminated based on a height direction of the moving object.

According to another embodiment of the present invention, there is provided a method for operating a laser radar apparatus, the method including dividing a plurality of light transmission and reception modules arranged concavely in an opposite direction to a scanning direction based on a surface vertical to the scanning direction into two or more groups; the two or more groups divided transmitting and receiving a laser beam to and from a target in different time frames from one another; reading signals received as the laser beam is transmitted and received; and obtaining at least one of a location, distance, and image of the target based on the signals read.

In the embodiment, the transmitting and receiving a laser beam to and from a target may include each of the plurality of light transmission and reception modules generating a laser beam; deflecting the generated laser beam and irradiating the deflected laser beam to the target; and detecting the laser beam reflected from the target as the laser beam is irradiated.

In the embodiment, the dividing a plurality of light transmission and reception modules into two or more groups may involve dividing the plurality of light transmission and reception modules such that adjacent light transmission and reception modules are divided into different groups from one another.

In the embodiment, the dividing a plurality of light transmission and reception modules may further include differentiating oddnumber$^{th}$ light transmission and reception modules based on a light transmission and reception module disposed at one side as a first group, and differentiating evennumber$^{th}$ light transmission and reception modules based on the light transmission and reception module disposed at one side as a second group, the first group operating in an Odd time frame, the second group operating in an Even time frame, and the Odd time frame and the Even time frame not overlapping each other in a time domain.

In the embodiment, the laser radar apparatus may be connected to a moving object.

A laser radar apparatus according to the aforementioned embodiments of the present invention includes a plurality of light transmission and reception modules arranged to form an engraved interior angle based on a scanning direction, thereby having an effect of reducing the number of light transmission and reception modules needed in the laser radar apparatus. Furthermore, a laser radar apparatus according to the aforementioned embodiments of the present invention includes light transmission and reception modules arranged to form an engraved interior angle, thereby having an irrotational structure so that it can be mounted inside a moving object.

BRIEF DESCRIPTION OF THE DRAWINGS

The above and other features and advantages of the present invention will become more apparent to those of ordinary skill in the art by describing in detail embodiments with reference to the attached drawings in which.

DETAILED DESCRIPTION

Hereinafter, embodiments will be described in greater detail with reference to the accompanying drawings. Embodiments are described herein with reference to cross-sectional illustrates that are schematic illustrations of embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but may include deviations in shapes that result, for example, from manufacturing. In the drawings, lengths and sizes of layers and regions may be exaggerated for clarity. Like reference numerals in the drawings denote like elements.

Terms such as 'first', and 'second' may be used to describe various components, but they should not limit the various components. Those terms are only used for the purpose of differentiating a component from other components. For example, a first component may be referred to as a second component, and a second component may be referred to as a first component and so forth without departing from the spirit and scope of the present invention. Furthermore, 'and/or' may include any one of or a combination of the components mentioned.

Furthermore, 'connected' represents that one component is directly connected to another component or indirectly connected through another component.

In this specification, a singular form may include a plural form as long as it is not specifically mentioned in a sentence. Furthermore, 'include/comprise' or 'including/comprising' used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, those terms should not be construed as having idealistic or overly formal meanings.

According to various embodiments of the present invention, there is provided a laser radar apparatus capable of performing panoramic scanning using a small number of light transmission and reception modules. Such a laser radar apparatus may obtain a 3-dimensional image through panoramic scanning.

Figure 1:
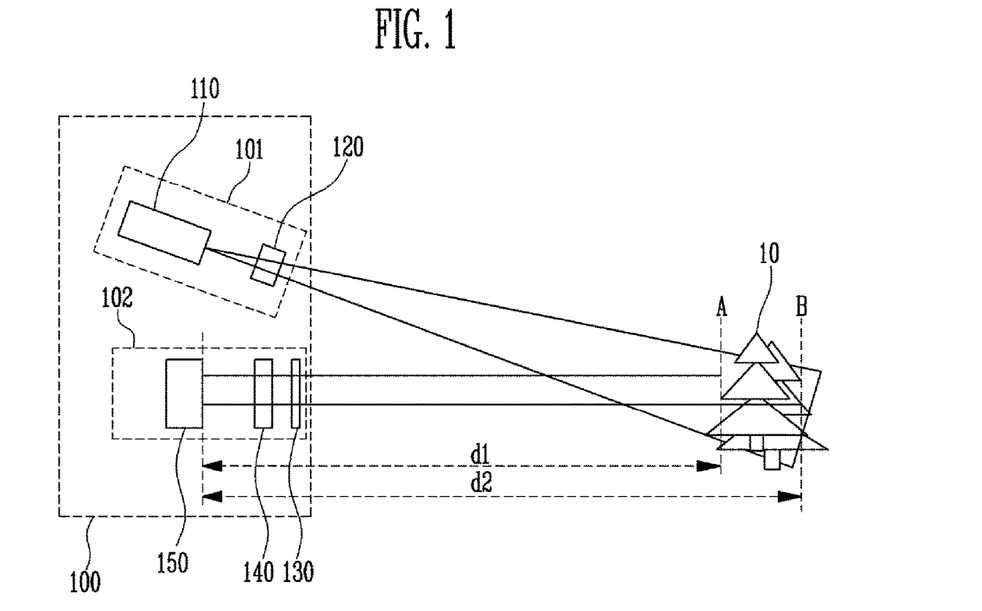
FIG. 1 is a view illustrating a light transmission and reception module according to an embodiment of the present invention.

FIG. 1 is a view illustrating a light transmission and reception module according to an embodiment of the present invention.

Referring to FIG. 1, the light transmission and reception module 100 includes a transmitter 101 and receiver 102.

The transmitter 101 defects a laser beam and irradiates the laser beam to a target 10. The transmitter 101 includes a light source 110 and light deflector 120.

The light source 110 generates a laser beam. The light source 110 may include a pulse laser. The light source 110 outputs the generated laser beam to the light deflector 120.

The light deflector 120 deflects the laser beam received from the light source 110 and irradiates the deflected laser beam to the target 10. Herein, the light deflector may irradiate the laser beam to different areas for detection of the target. The light deflector 120 adjusts the irradiating direction of the laser beam so that it is irradiated to different positions of the target 10 as time passes.

The receiver 102 receives the laser beam reflected from the target 10. The receiver 102 includes a light filter 130, light receiving lens 140, and light detector 150.

The light filter 130 filters the laser beam reflected from the target 10. The light filter 130 outputs the filtered laser beam to the light receiving lens 140. Herein, the light filter 130 may selectively be included in a light transmission and reception module 100 if necessary.

The light receiving lens 140 forms a focus to output the laser beam to the light detector 150.

The light detector 150 detects the laser beam output from the light receiving lens. For example, the light detector 150 computes pieces of information (d1, d2) on the distance to each point (A, B) of the target. By doing this, the light detector 150 or an image processor configured to receive a signal of the light detector 150 may determine a 3-dimensional image of the target using the computed pieces of information (d1, d2) on the distance to each point A, B.

Figure 2:
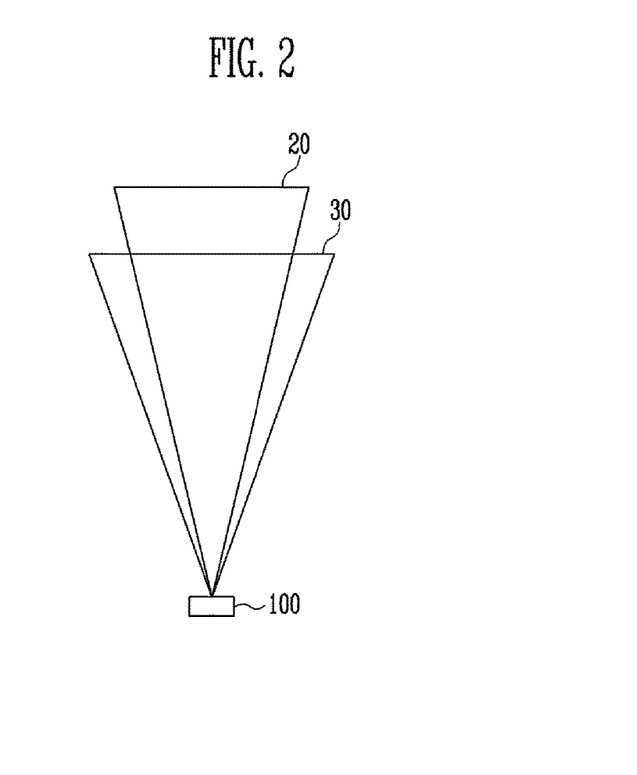
FIG. 2 is a view illustrating an FOV according to a transmitting and receiving operation of a light transmission and reception module according to an embodiment of the present invention.

FIG. 2 is a view illustrating an FOV according to a transmitting and receiving operation of a light transmission and reception module according to an embodiment of the present invention.

Referring to FIG. 2, the light transmission and reception module 100 includes an area for irradiation of a laser beam, that is, an area for transmission of the laser beam (transmitting Field of View, hereinafter referred to as 'FOV') 20 and an area for reflection of a laser beam, that is, an area for reception of the laser beam (receiving FOV) 30.

Figure 3:
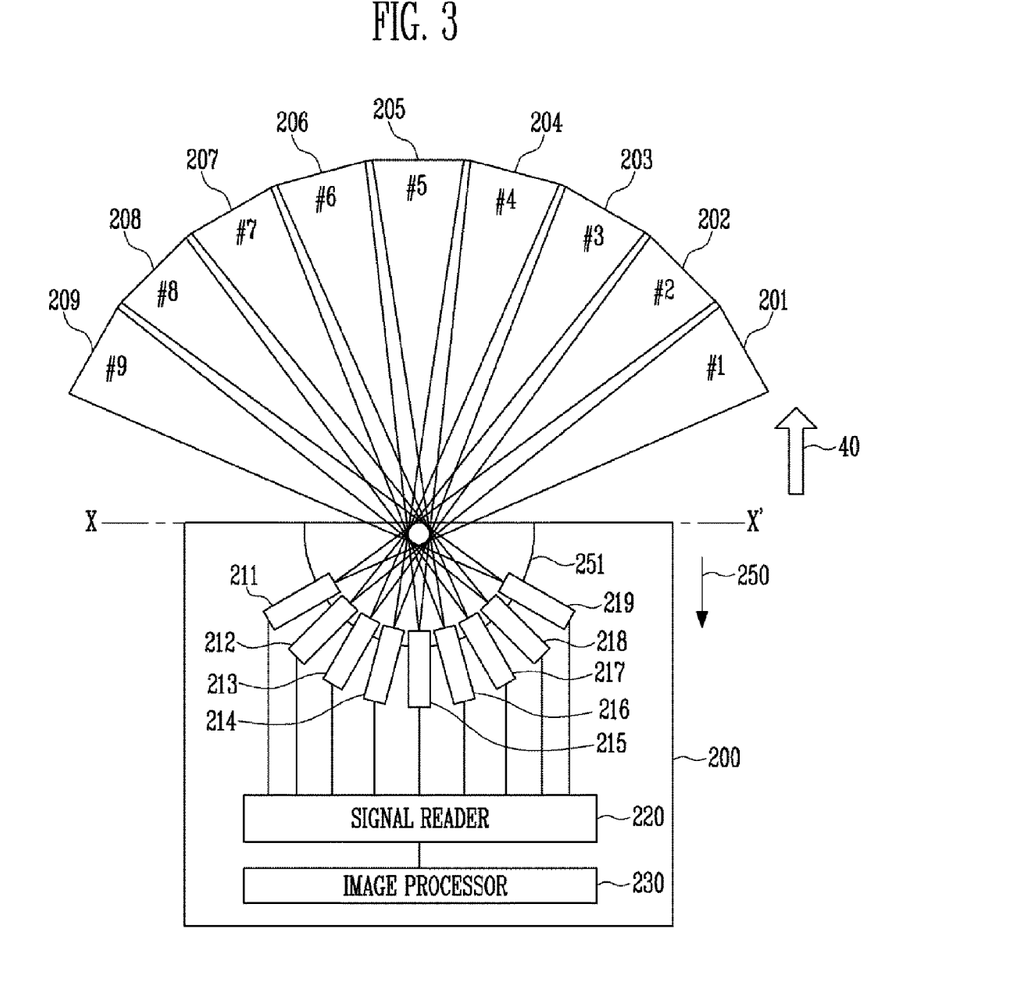
FIG. 3 is a view illustrating a laser radar apparatus according to an embodiment of the present invention.

FIG. 3 is a view illustrating a laser radar apparatus according to an embodiment of the present invention.

Referring to FIG. 3, the laser radar apparatus 200 includes a plurality of light transmission and reception modules 211-219, signal reader 220, and image processor 230. Herein, the laser radar apparatus 200 may be called a panoramic scanner system.

Each of the plurality of light transmission and reception modules 211-219 has the same structure as the light transmission and reception module 100 explained with reference to FIGS. 1 and 2. The plurality of light transmission and reception modules 211-219 are arranged for panoramic scanning. The plurality of light transmission and reception modules 211-219 are arranged concavely in an opposite direction 250 to a scanning direction 40 based on a surface X-X' that is vertical to the scanning direction (or photographing direction). For example, each of the plurality of light transmission and reception modules 211-219 may be arranged such that the front surface that transmits and receives a laser beam faces toward the scanning direction 40 and that the modules are spaced by a certain distance from one another along an arc 251 of a half circle. Herein, the arc 251 of the half circle has a concave shape based on the scanning direction 40. Furthermore, the plurality of light transmission and reception modules 211-219 may be arranged such that they are laminated based on a height direction. By the aforementioned, the plurality of light transmission and reception modules 211-219 are positioned to scan in directions within a range of about 0° to 180° based on the front direction.

Herein, transmitting FOVs 201-209 formed by transmitters of the plurality of light transmission and reception modules 211-219 are illustrated. For example, transmitter TX1 of a first light transmission and reception module 211 forms a first transmitting FOV 201, and transmitter TX2 of a second light transmission and reception module 212 forms a second transmitting FOV 202. Likewise, transmitters TX3-TX9 of the remaining light transmission and reception modules 213-219 form a third transmitting FOV 203 to a ninth transmitting FOV 209, respectively.

The signal reader 220 is connected to each of the plurality of light transmission and reception modules 211-219. Through this connection, the signal reader 220 collects the signals that went through laser beam transmission and reception from each of the plurality of light transmission and reception modules 211-219. The signal reader 220 reads the collected signals, and outputs information on the read signals to the image processor 230.

Meanwhile, the signal reader 220 may control operations of each of the plurality of light transmission and reception modules 211-219.

The image processor 230 may receive information on the read signals, image-process the received signals, and obtain an image of a panoramic scanning Herein, the image processor 230 may obtain not only a 2-dimensional image but also a 3-dimensional image of a panoramic scanning (or a target located in a panoramic direction). Furthermore, the image processor 230 may obtain a location or distance of a target located in a panoramic direction based on the signals read.

Hereinbelow, an operation of obtaining a 3-dimensional image in the image processor 230 will be explained. The image processor 230 may determine the distance to the target using information on the read laser beam or determine a 3-dimensional image of the target using information on the intensity of the reflected light.

Herein, the laser radar apparatus 200 includes nine light transmission and reception modules, but this is just an example, and thus the laser radar apparatus 200 may include more number or less number of light transmission and reception modules than nine.

As such, in the laser radar apparatus 200 according to an embodiment of the present invention, the plurality of light transmission and reception modules 211-219 are arranged to form an engraved interior angle. For example, when being mounted onto a moving object such as a vehicle, the laser radar apparatus 200 may be configured to have a small number of light transmission and reception modules, and to have a space enough to provide an image processor at the back side of the plurality of light transmission and reception modules.

FIG. 3 illustrates a case where there are nine light transmission and reception modules 211-219. However, depending on embodiments, the number of light transmission and reception modules to be included in a laser radar apparatus may be adjusted. That is, there is no limitation to the number of light transmission and reception modules that may be included in a laser radar apparatus according to an embodiment of the present invention, and the number of light transmission and reception modules that may be included in the laser radar may vary depending on the FOV of each light transmission and reception module. For example, when the FOV of each light transmission and reception module is narrower than the FOV 201-209 of each light transmission and reception module 211-219 illustrated in FIG. 3, more light transmission and reception modules may be used than illustrated in FIG. 3. By another example, when the FOV of each light transmission and reception module is broader than the FOV 201-209 of each light transmission and reception module 211-219 illustrated in FIG. 3, less light transmission and reception modules may be used than illustrated in FIG. 3.

Figure 4:
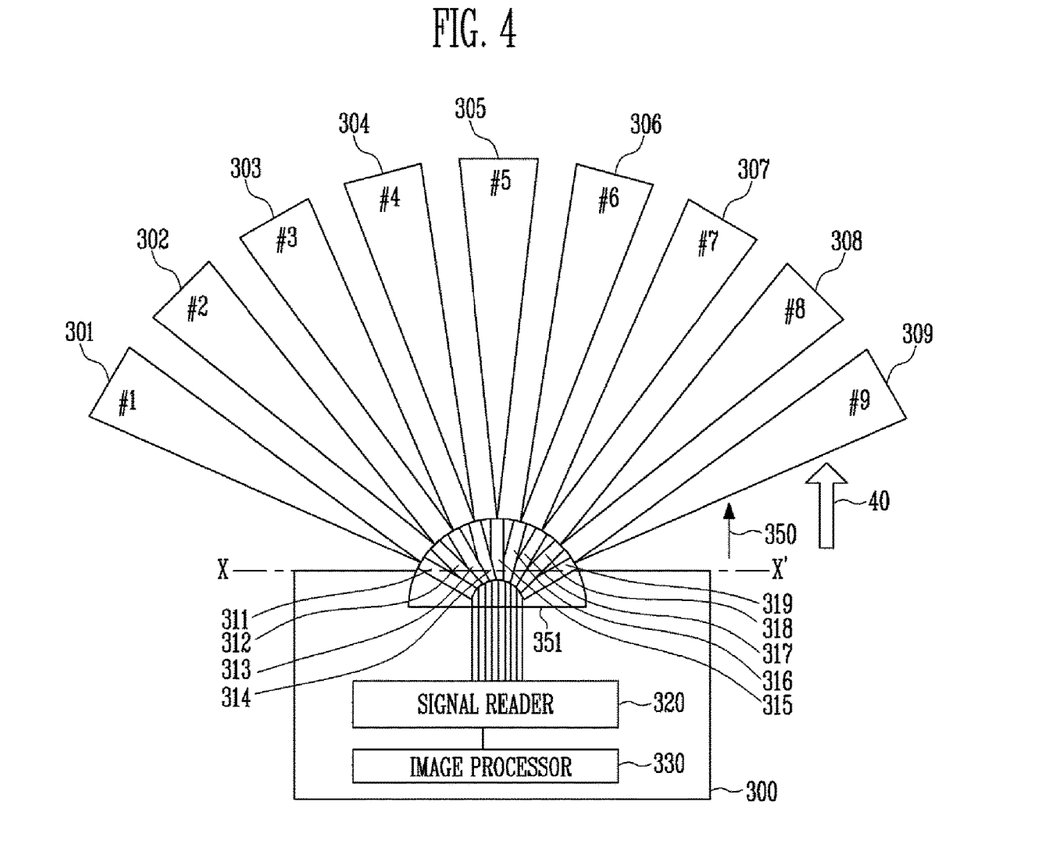
FIG. 4 is a view illustrating another radar apparatus having the same number of light transmission and reception modules as a laser radar apparatus according to an embodiment of the present invention.

FIG. 4 is a view illustrating another radar apparatus having the same number of light transmission and reception modules as a laser radar apparatus according to an embodiment of the present invention.

Referring to FIG. 4, a laser radar apparatus 300 includes a plurality of light transmission and reception modules 311-319, signal reader 320, and image processor 330.

Herein, FIG. 3 should be referred to for explanation about the configuration of the signal reader 320 and image processor 330.

Meanwhile, each of the plurality of light transmission and reception modules 311-319 has the same structure as the light transmission and reception module 100 explained with reference to FIGS. 1 and 2. The plurality of light transmission and reception modules 311-319 are arranged for panoramic scanning.

Herein, the plurality of light transmission and reception modules 311-319 are arranged convexly in the same direction 350 as a scanning direction 40 based on a surface X-X' that is vertical to the scanning direction (or photographing direction). For example, each of the plurality of light transmission and reception modules 311-319 may be arranged such that the front surface that transmits and receives a laser beam faces towards the scanning direction 40 and that the modules are spaced by a certain distance from one another along an arc 351 of a half circle. Herein, the arc 351 of the half circle has a convex shape based on the scanning direction 40.

Herein, transmitting FOVs 301-309 formed by transmitters of the plurality of light transmission and reception modules 311-319 are illustrated. For example, transmitter TX1 of a first light transmission and reception module 311 forms a first transmitting FOV 301, and transmitter TX2 of a second light transmission and reception module 312 forms a second transmitting FOV 302. Likewise, transmitters TX3-TX9 of the remaining light transmission and reception modules 313-319 form a third transmitting FOV 303 to a ninth transmitting FOV 309, respectively. Furthermore, receiving FOVs may be formed in a similar format as the transmitting FOVs 301-309.

By the aforementioned, the laser radar apparatus 300 of FIG. 4 includes the same number of light transmission and reception modules as the laser radar apparatus 200 of FIG. 3. However, in the laser radar apparatus 300, the plurality of light transmission and reception modules 311-319 are arranged to form an embossed exterior angle, and thus there exists an area where a target cannot be detected through the transmitting FOVs 301-309. Therefore, in order to detect the target, the laser radar apparatus 300 must include more light transmission and reception modules than the laser radar apparatus 200. Therefore, the laser radar apparatus 200 that includes the plurality of light transmission and reception modules 211-219 arranged to form an engraved interior angle instead of an embossed exterior angle may be embodied with less number of light transmission and reception modules than the laser radar apparatus 300 of FIG. 4.

Furthermore, although the laser radar apparatus 300 of FIG. 4 includes nine light transmission and reception modules 311-319, the number of light transmission and reception modules to be included in a laser radar apparatus may be adjusted depending on embodiments. That is, there is no limitation to the number of light transmission and reception modules that may be included in a laser radar apparatus according to an embodiment of the present invention, and the number of light transmission and reception modules that may be included in a laser radar may vary depending on the FOV of each light transmission and reception module. For example, when the FOV of each light transmission and reception module is narrower than the FOV 301-309 of each light transmission and reception module 311-319 illustrated in FIG. 4, more light transmission and reception modules may be used than illustrated in FIG. 4. By another example, when the FOV of each light transmission and reception module is broader than the FOV 301-309 of each light transmission and reception module 311-319 illustrated in FIG. 4, less light transmission and reception modules may be used than illustrated in FIG. 4.

Figure 5:
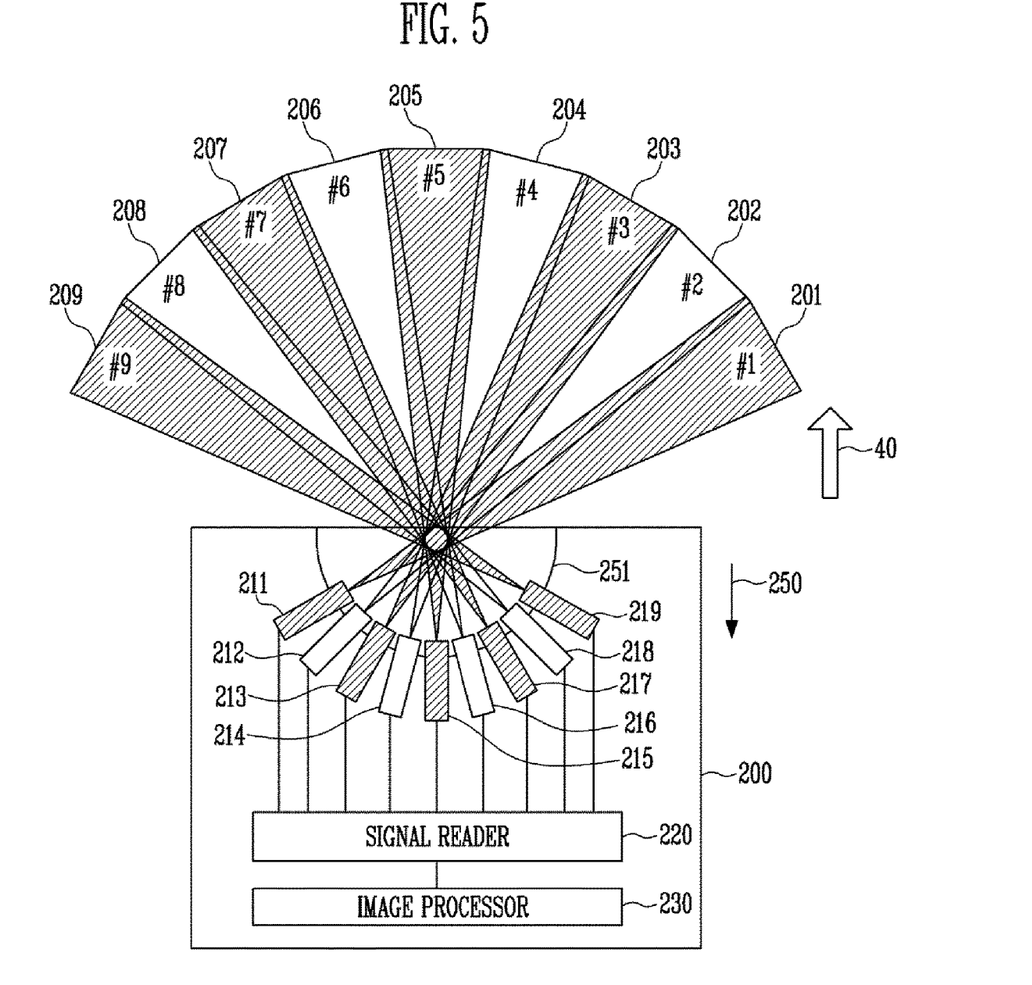
FIG. 5 is an exemplary view illustrating a driving operation in an Odd time frame in a laser radar apparatus of FIG. 2.

FIG. 5 is an exemplary view illustrating a driving operation in an Odd time frame in a laser radar apparatus of FIG. 2.

Referring to FIG. 5, adjacent FOVs (transmitting areas (transmitting (FOVs)) or receiving areas (receiving (FOVs)) may overlap each other. To prevent this, the laser radar apparatus 200 simultaneously operates transmitters TX1, TX3, TX5, TX7, TX9 or simultaneously operates receivers RX1, RX3, RX5, RX7, RX9 of a first light transmission and reception module 211, third light transmission and reception module 213, fifth light transmission and reception module 215, seventh light transmission and reception module 217, and ninth light transmission and reception module 219 in an Odd time frame corresponding to a first time section. By doing this, the light transmission and reception modules that are adjacent to the light transmission and reception modules operating in the Odd time frame are prevented from operating, thereby avoiding overlapping.

For example, when signals are being transmitted from the transmitting areas (transmitting FOVs (201, 203, 205, 207, 209)) in the Odd time frame, signals are not transmitted from other transmitting areas (transmitting FOVs (202, 204, 206, 208)). Likewise, in the Odd time frame, signals are received only in the receiving areas (receiving FOVs) corresponding to the transmitting areas (transmitting FOVs (201, 203, 205, 207, 209)), whereas signals are not received in the receiving areas corresponding to the other transmitting areas (transmitting FOVs (202, 204, 206, 208)).

Figure 6:
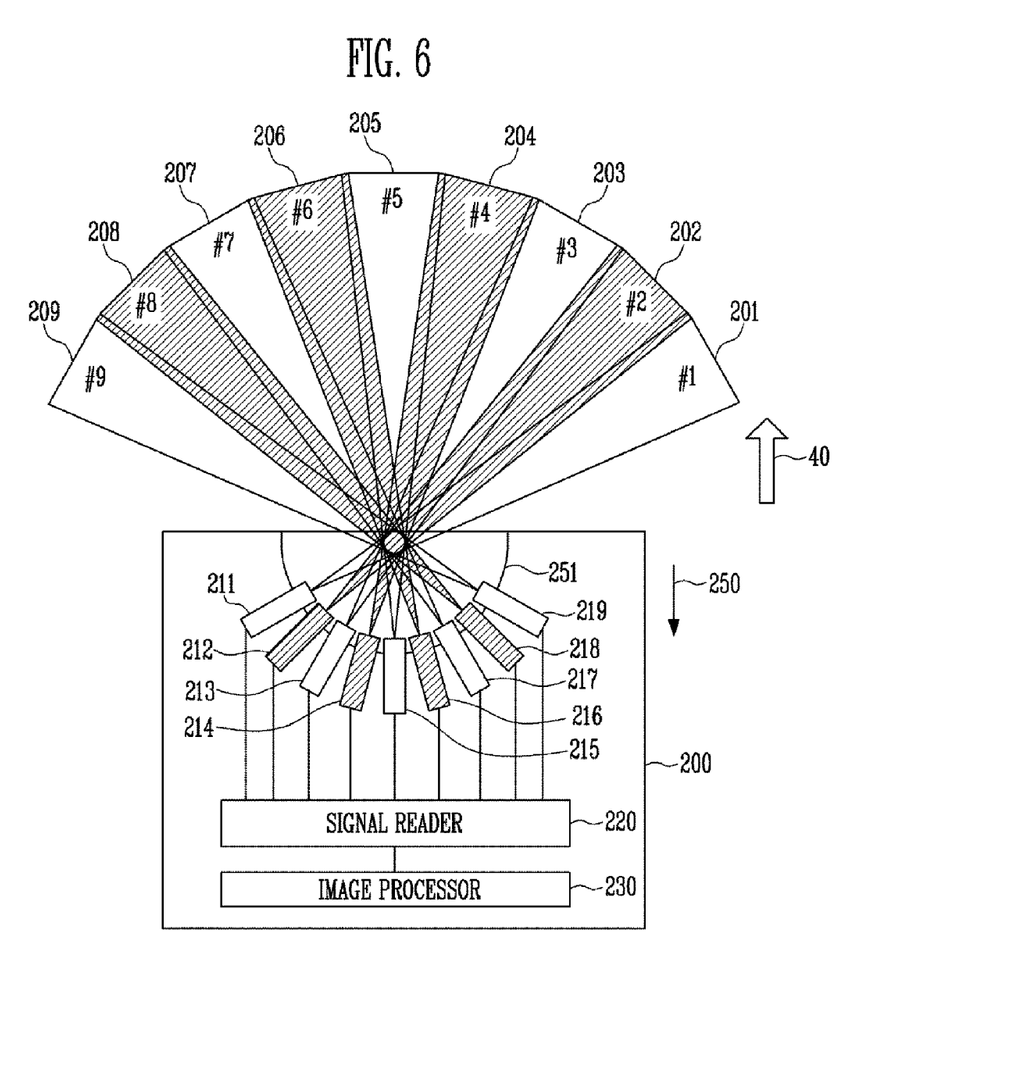
FIG. 6 is an exemplary view illustrating a driving operation in an Even time frame in a laser radar apparatus of FIG. 2.

FIG. 6 is an exemplary view illustrating a driving operation in an Even time frame in a laser radar apparatus of FIG. 2.

Referring to FIG. 6, in the laser radar apparatus 200, adjacent FOVs (transmitting areas (transmitting FOVs)) or receiving areas (receiving FOVs)) may overlap each other. To prevent this, the laser radar apparatus 200 simultaneously operates transmitters TX2, TX4, TX6, TX8 or simultaneously operates receivers RX2, RX4, RX6, RX8 of a second light transmission and reception module 212, fourth light transmission and reception module 214, sixth light transmission and reception module 216, and eight light transmission and reception module 218 in an Even time frame corresponding to a second time section. Herein, the second time section is a time section that does not overlap the first time section. By the aforementioned, the light transmission and reception modules that are adjacent to the light transmission and reception modules operating in the Even time frame are prevented from operating, thereby avoiding overlapping.

For example, when signals are transmitted from the transmitting areas (transmitting FOVs (202, 204, 206, 208)) in the Even time frame, signals are not transmitted from other transmitting areas (transmitting FOVs (201, 203, 205, 207, 209)). Likewise, signals are received only in the receiving areas (receiving FOVs) corresponding to the transmitting areas (transmitting FOVs (202, 204, 206, 208)) in the Even time frame, whereas signals are not received in the receiving areas corresponding to other transmitting areas (transmitting FOVs (201, 203, 205, 207, 209)).

Two time frames were explained with reference to FIGS. 5 and 6, but a laser radar apparatus according embodiments of the present invention may be operated in three or more time frames.

For example, supposing the laser radar apparatus is operated in three different time frames, in a first time frame, the transmitters or receivers of a first light transmission and reception module 211, fourth light transmission and reception module 214, and seventh light transmission and reception module 217 operate. Next, in a second time frame, the transmitters or receivers of a second light transmission and reception module 212, fifth light transmission and reception module 215, and eight light transmission and reception module 218 operate. Lastly, in a third time frame, the transmitters or receivers of a third light transmission and reception module 213, sixth light transmission and reception module 216, and ninth light transmission and reception module 219 operate. Herein, the first to third time frames do not overlap one another either.

As explained with reference to FIGS. 3 and 4, there is no limitation to the number of light transmission and reception modules that may be included in a laser radar apparatus according to an embodiment of the present invention, and the number of light transmission and reception modules that may be included in the laser radar apparatus may vary depending on circumstances. For example, when the FOV of a light transmission and reception module is relatively broad, the laser radar apparatus may include less light and transmission and reception modules, and when the FOV of a light transmission and reception module is relatively narrow, the laser radar apparatus may include more light and transmission and reception modules.

Figure 7:
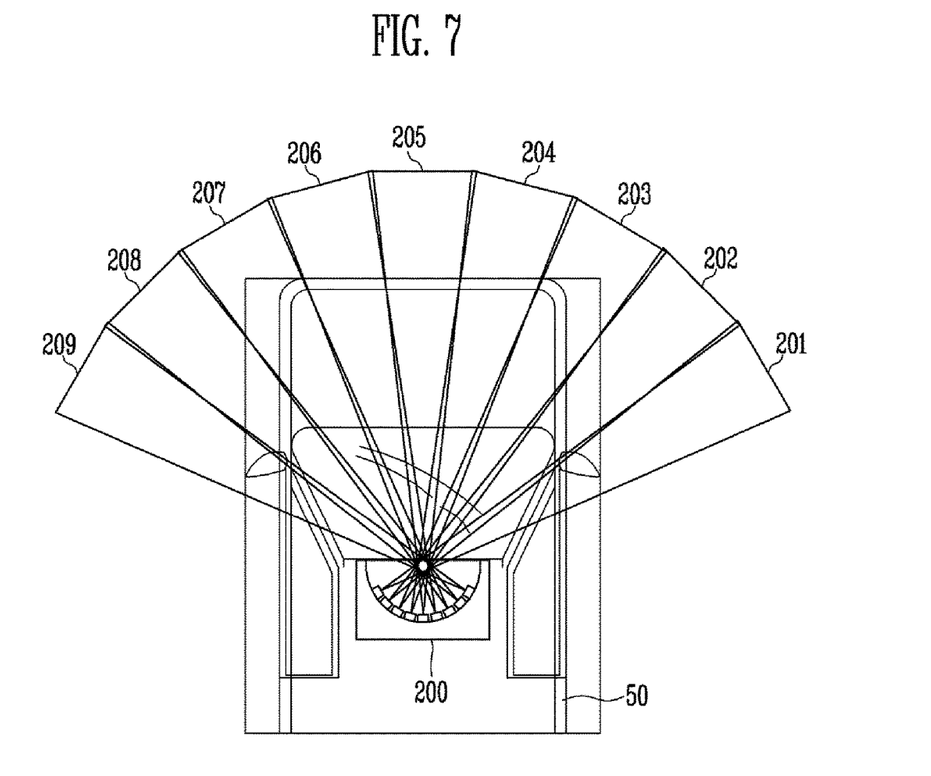
FIG. 7 is a view illustrating a multi-section operation of a laser radar apparatus according to an embodiment of the present invention applied to a vehicle.

FIG. 7 is a view illustrating a multi-section operation of a laser radar apparatus according to an embodiment of the present invention applied to a vehicle.

Referring to FIG. 7, the laser radar apparatus 200 may be attached to a moving object, for example a vehicle 50. Herein, the laser radar apparatus 200 may scan in a panoramic direction of 180° ahead of the vehicle 50. For example, the laser radar apparatus may operate together with an application for autonomous cruise. The laser radar apparatus is arranged to have a predetermined distance based on a width direction of the vehicle 50. Furthermore, the laser radar apparatus 200 may be arranged to have a laminated format in a height direction of the vehicle 50.

Figure 8:
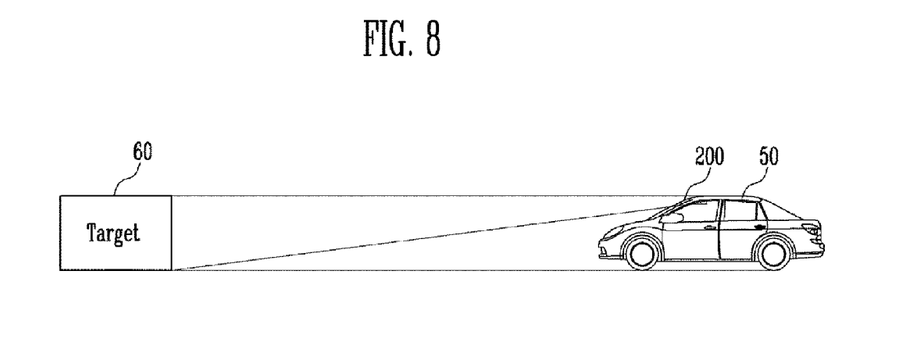
FIG. 8 is a view illustrating one side of a vehicle to which a laser radar apparatus according to an embodiment of the present invention has been applied.

FIG. 8 is a view illustrating one side of a vehicle to which a laser radar apparatus according to an embodiment of the present invention has been applied.

Referring to FIG. 8, the laser radar apparatus 200 may be positioned, for example, near a room mirror of the vehicle 50. Accordingly, the laser radar apparatus may obtain at least one of a location, distance, and image of a target 60 in a panoramic direction.

Figure 9:
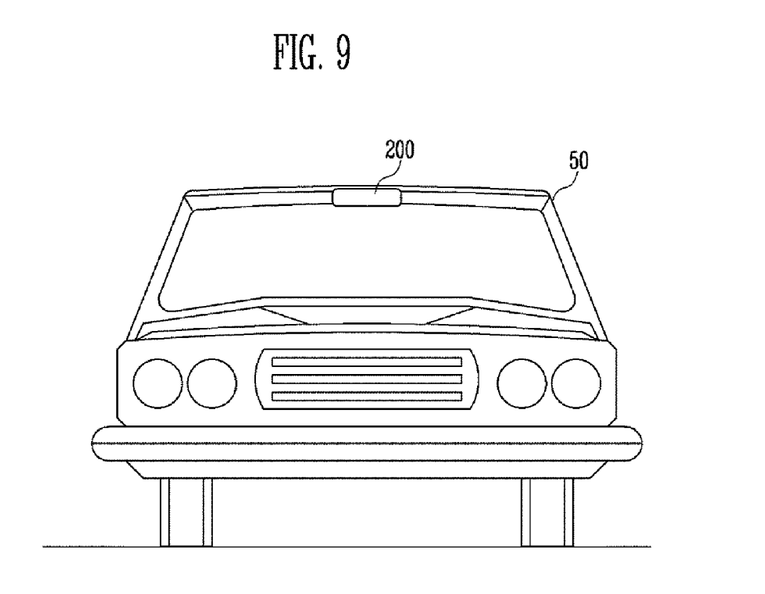
FIG. 9 is a view illustrating the front side of a vehicle to which a laser radar apparatus according to an embodiment of the present invention has been applied.

FIG. 9 is a view illustrating the front side of a vehicle where a laser radar apparatus according to an embodiment of the present invention has been applied.

Referring to FIG. 9, the laser radar apparatus 200 may be positioned at the center of the front side of the vehicle 50.

FIGS. 8 and 9 merely illustrate examples where the laser radar apparatus 200 is attached to the vehicle 50, and thus the laser radar apparatus 200 may be positioned in other locations besides the aforementioned locations.

Figure 10:
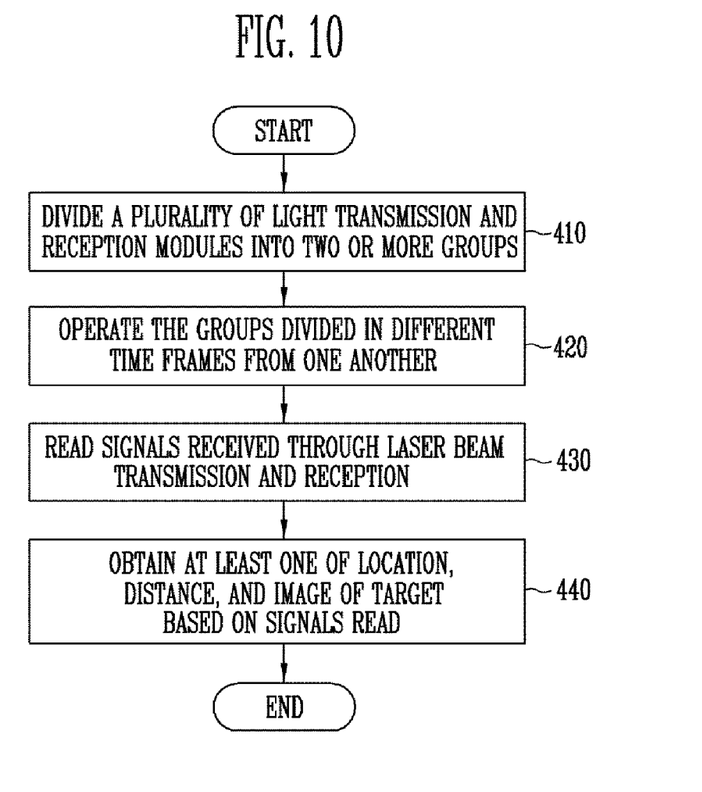
FIG. 10 is a flowchart of operations of a laser radar apparatus according to an embodiment of the present invention.

FIG. 10 is a flowchart of operations of a laser radar apparatus according to an embodiment of the present invention.

Referring to FIG. 10, in the laser radar apparatus 200, a plurality of light transmission and reception modules are divided into at least two groups (step 410). Herein, the light transmission and reception modules are divided such that adjacent light transmission and reception modules do not belong to the same group. That is, adjacent light transmission and reception modules are divided into different groups.

The laser radar apparatus 200 operates each of the plurality of light transmission and reception modules divided into groups in different time sections (step 420). By doing this, the laser radar apparatus 200 may irradiate laser beams alternately in a time sharing method.

The laser radar apparatus 200 reads signals received according to a transmission and reception of a laser beam (step 430).

The laser radar apparatus 200 obtains at least one of a location, distance, and image of a target based on the signals read (step 440).

A laser radar apparatus according to the aforementioned embodiments of the present invention is not configured to have a shape of an embossed rotating body, and thus it can be mounted inside a moving body, and can alternately operate the transmitters and receivers included in the light transmission and reception modules, thereby detecting an object in a panoramic direction. Just one certain light transmission and reception module cannot scan in a panoramic direction, and the area that can be scanned through one light transmission and reception module is predetermined. Therefore, with a laser radar apparatus having light transmission and reception modules arranged to form an engraved interior angle, it is possible to reduce the volume of the entirety of the laser radar apparatus using a small number of light transmission and reception modules.

Furthermore, in a laser radar apparatus according to the aforementioned embodiments of the present invention, the space at the back side of the light transmission and reception modules is bigger than that in a laser radar apparatus having a structure of an embossed exterior angle, and thus it is possible to mount an image processor configured to process a 3-dimensional image inside the apparatus.

Furthermore, a laser radar apparatus according to the aforementioned embodiments of the present invention has an irrotational structure that can be mounted inside a moving object without protruding outside, thereby saving the mounting costs.

Furthermore, a laser radar apparatus according to the aforementioned embodiments of the present invention can be utilized in not only display TVs, military equipments for detecting targets, and vehicles that need to obtain 3-dimensional images for operations such as autonomous cruising but also in other various fields and apparatuses besides the aforementioned.

In the drawings and specification, there have been disclosed typical exemplary embodiments of the invention, and although specific terms are employed, they are used in a generic and descriptive sense only and not for purposes of limitation. As for the scope of the invention, it is to be set forth in the following claims. Therefore, it will be understood by those of ordinary skill in the art that various changes in form and details may be made therein without departing from the spirit and scope of the present invention as defined by the following claims.

What is claimed is:

1. A laser radar apparatus comprising:
a plurality of light transmission and reception modules arranged concavely in an opposite direction to a scanning direction based on a surface vertical to the scanning direction, wherein each of the plurality of light transmission and reception modules comprises
a transmitter configured to deflect a laser beam and to irradiate the deflected laser beam to a target, and
a receiver configured to receive the laser beam reflected from the target, wherein
the plurality of light transmission and reception modules are divided into two or more groups, and the transmitters and receivers belonging to a group are driven in a different time frame from the transmitters and receivers belonging to other groups.

2. The apparatus according to claim 1,
wherein adjacent light transmission and reception modules are divided into different groups from one another.

3. The apparatus according to claim 2,
wherein, of the plurality of light transmission and reception modules, a first group comprising oddnumber$^{th}$ light transmission and reception modules based on a light transmission and reception module disposed at one side is operated in an Odd time frame, and a second group comprising evennumber$^{th}$ light transmission and reception modules based on the light transmission and reception module disposed at one side is operated in an Even time frame, the Odd time frame and the Even time frame not overlapping each other in a time domain.

4. A laser radar apparatus, comprising:
a plurality of light transmission and reception modules arranged concavely in an opposite direction to a scanning direction based on a surface vertical to the scanning direction, each of the plurality of light transmission and reception modules including
a transmitter configured to deflect a laser beam and to irradiate the deflected laser beam to a target, and
a receiver configured to receive the laser beam reflected from the target;
a signal reader configured to control the plurality of light transmission and reception modules to operate at different time periods from one another, and to read the signals received through laser beam transmission and reception from each of the plurality of light transmission and reception modules; and
an image processor configured to obtain at least one of a location, distance and image of the target based on the signals read.

5. The apparatus according to claim 4,
wherein the laser radar apparatus is connected to a moving object.

6. The apparatus according to claim 5,
wherein the plurality of light transmission and reception modules are arranged to be spaced by a predetermined distance based on a width direction of the moving object.

7. The apparatus according to claim 5,
wherein the plurality of light transmission and reception modules are arranged to be laminated based on a height direction of the moving object.

8. A method for operating a laser radar apparatus, the method comprising:
dividing a plurality of light transmission and reception modules arranged concavely in an opposite direction to a scanning direction based on a surface vertical to the scanning direction into two or more groups;
the two or more groups divided transmitting and receiving a laser beam to and from a target in different time frames from one another;
reading signals received as the laser beam is transmitted and received; and
obtaining at least one of a location, distance, and image of the target based on the signals read.

9. The method according to claim 8,
wherein the transmitting and receiving a laser beam to and from a target comprises:
each of the plurality of light transmission and reception modules generating a laser beam;
deflecting the generated laser beam and irradiating the deflected laser beam to the target; and
detecting the laser beam reflected from the target as the laser beam is irradiated.

10. The method according to claim 8,
wherein the dividing a plurality of light transmission and reception modules into two or more groups involves dividing the plurality of light transmission and reception modules such that adjacent light transmission and reception modules are divided into different groups from one another.

11. The method according to claim 10,
wherein the dividing a plurality of light transmission and reception modules further comprises differentiating oddnumber$^{th}$ light transmission and reception modules based on a light transmission and reception module disposed at one side as a first group, and differentiating evennumber$^{th}$ light transmission and reception modules based on the light transmission and reception module disposed at one side as a second group,
the first group operating in an Odd time frame, the second group operating in an Even time frame, and the Odd time frame and the Even time frame not overlapping each other in a time domain.

12. The method according to claim 11,
wherein the laser radar apparatus is connected to a moving object.

* * * * *